Oct. 1, 1935.   O. F. CARLSON   2,015,708
TRACTOR PUSHED IMPLEMENT
Original Filed Aug. 20, 1931   8 Sheets-Sheet 1

INVENTOR.
Oscar F. Carlson,
BY Brown, Jackson, Boettcher & Dienner.
ATTORNEYS.

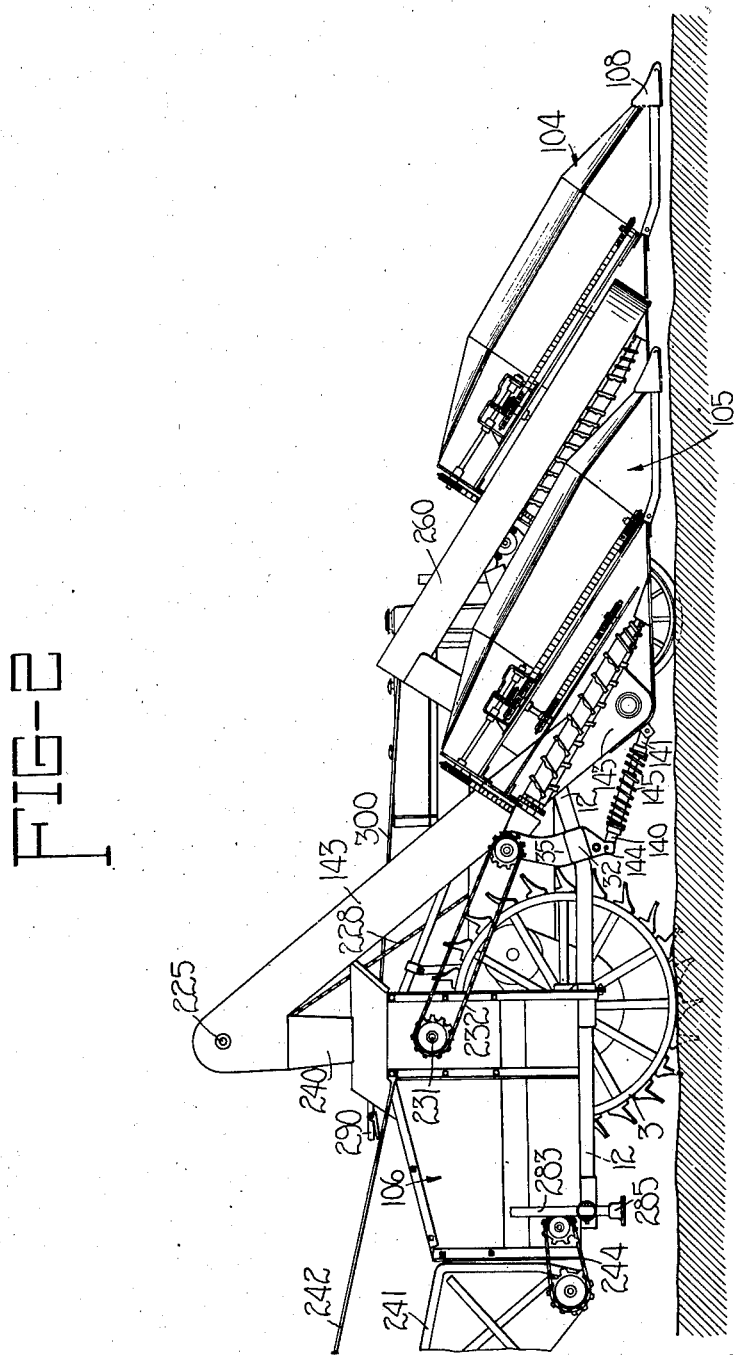

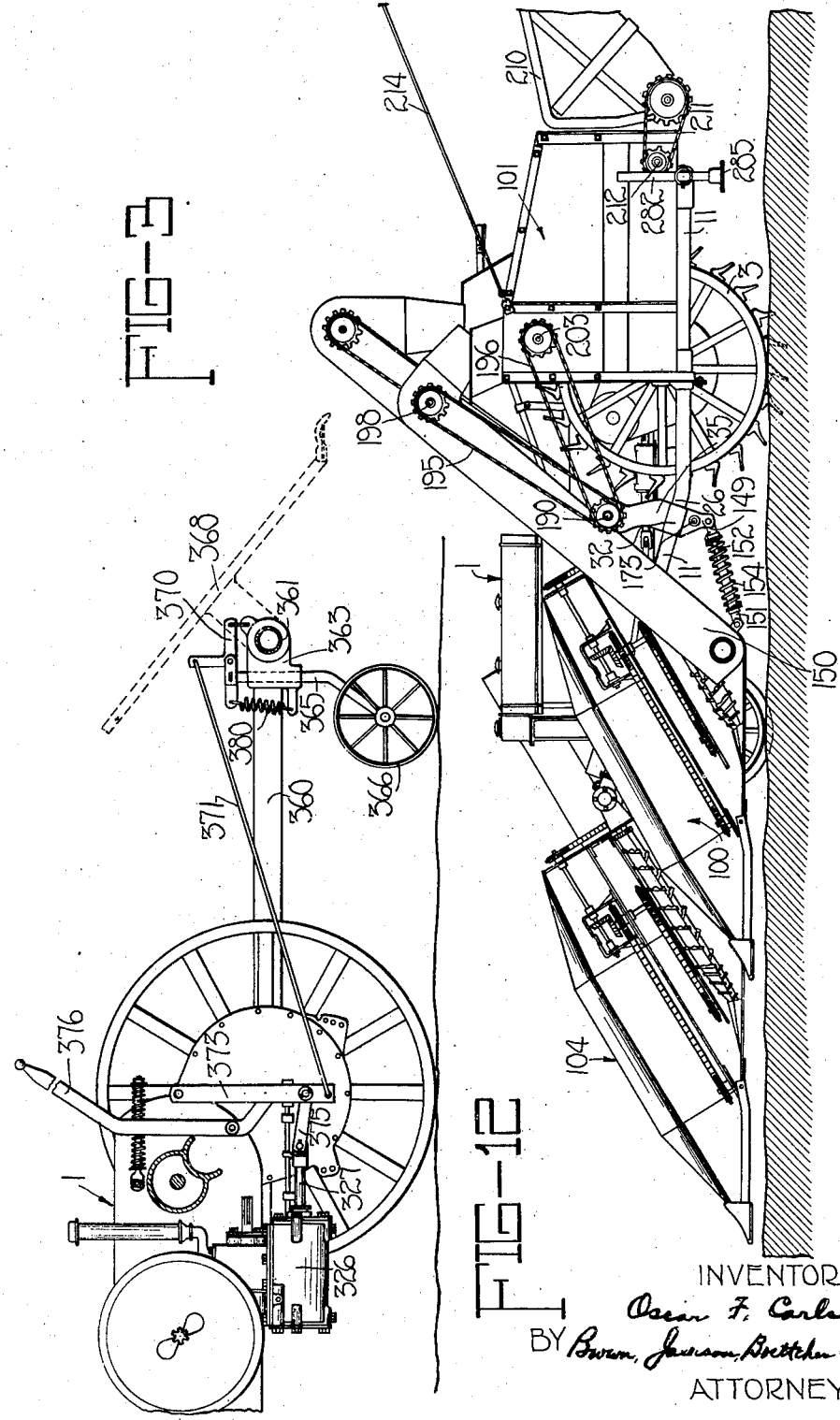

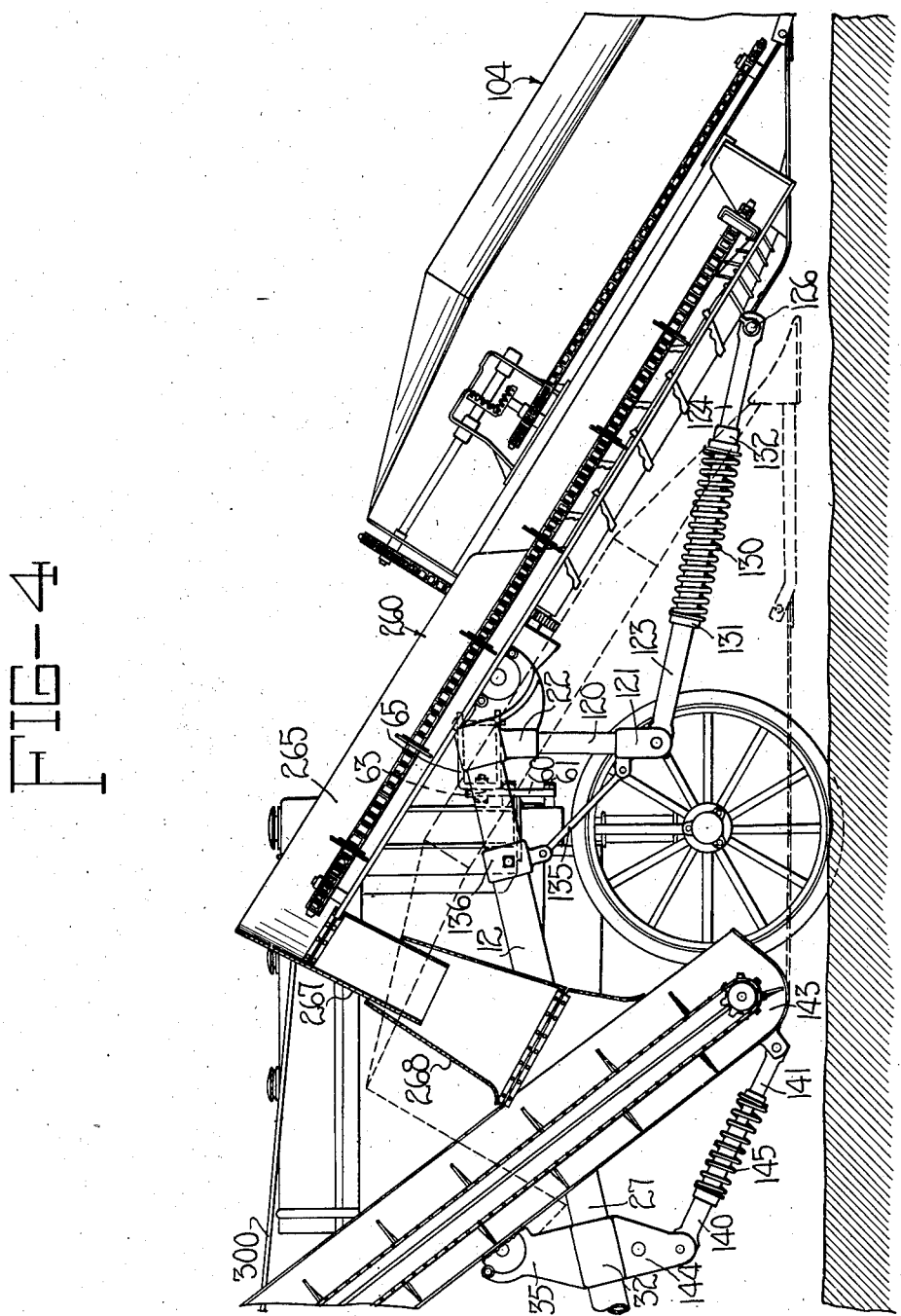

Oct. 1, 1935.  O. F. CARLSON  2,015,708
TRACTOR PUSHED IMPLEMENT
Original Filed Aug. 20, 1931   8 Sheets-Sheet 5
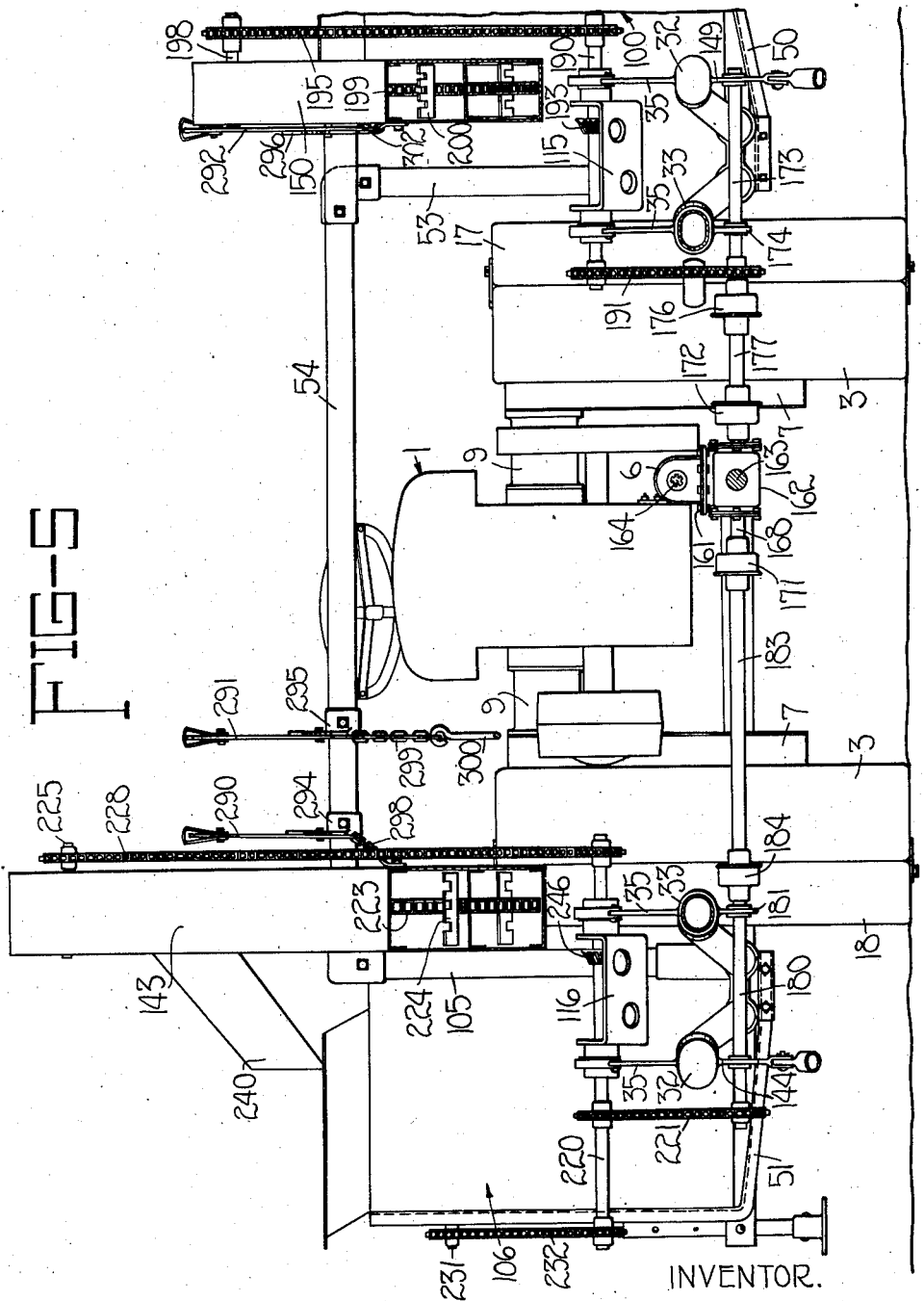
INVENTOR.
Oscar F. Carlson,
BY Brown, Jackson, Boettcher & Dienner.
ATTORNEYS.

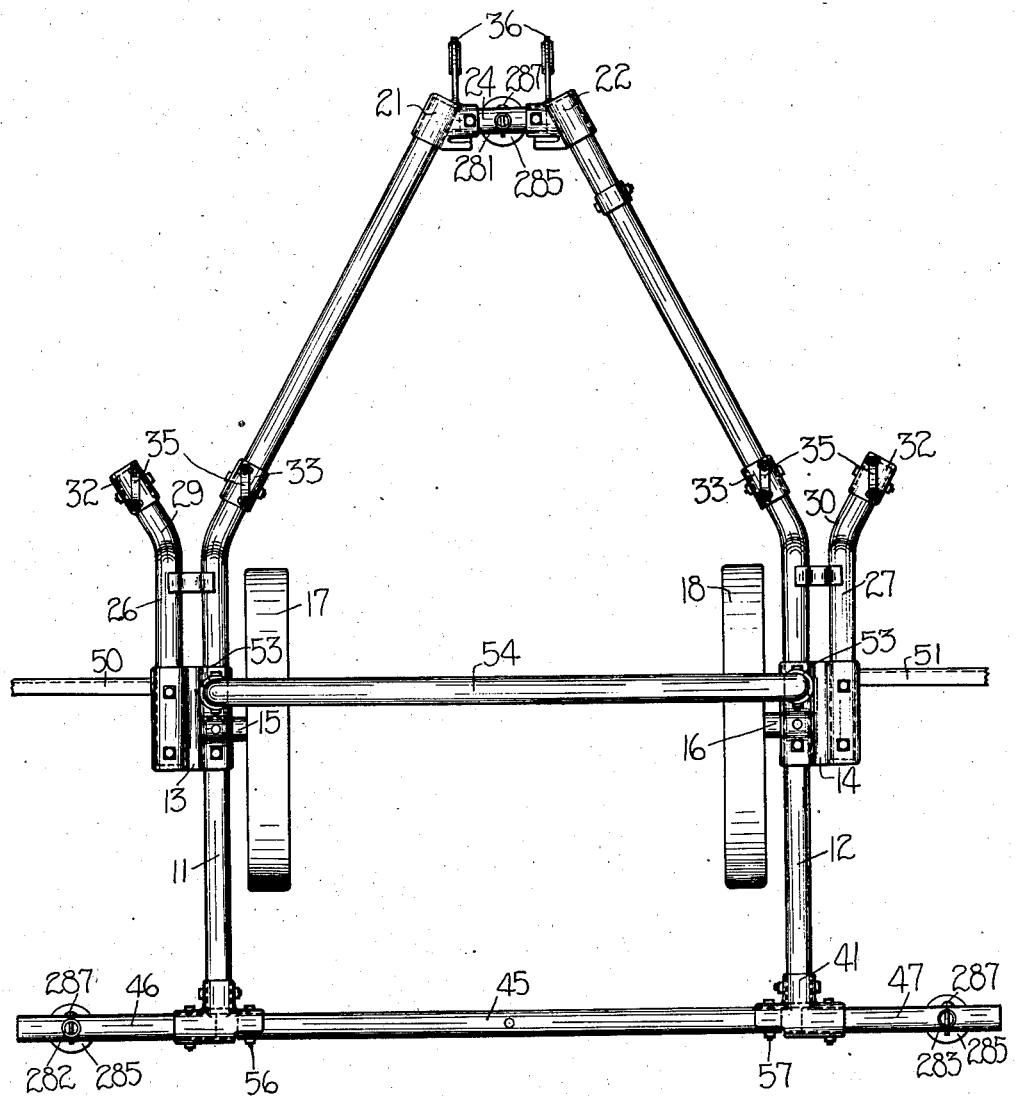

Oct. 1, 1935.  O. F. CARLSON  2,015,708
TRACTOR PUSHED IMPLEMENT
Original Filed Aug. 20, 1931  8 Sheets-Sheet 7
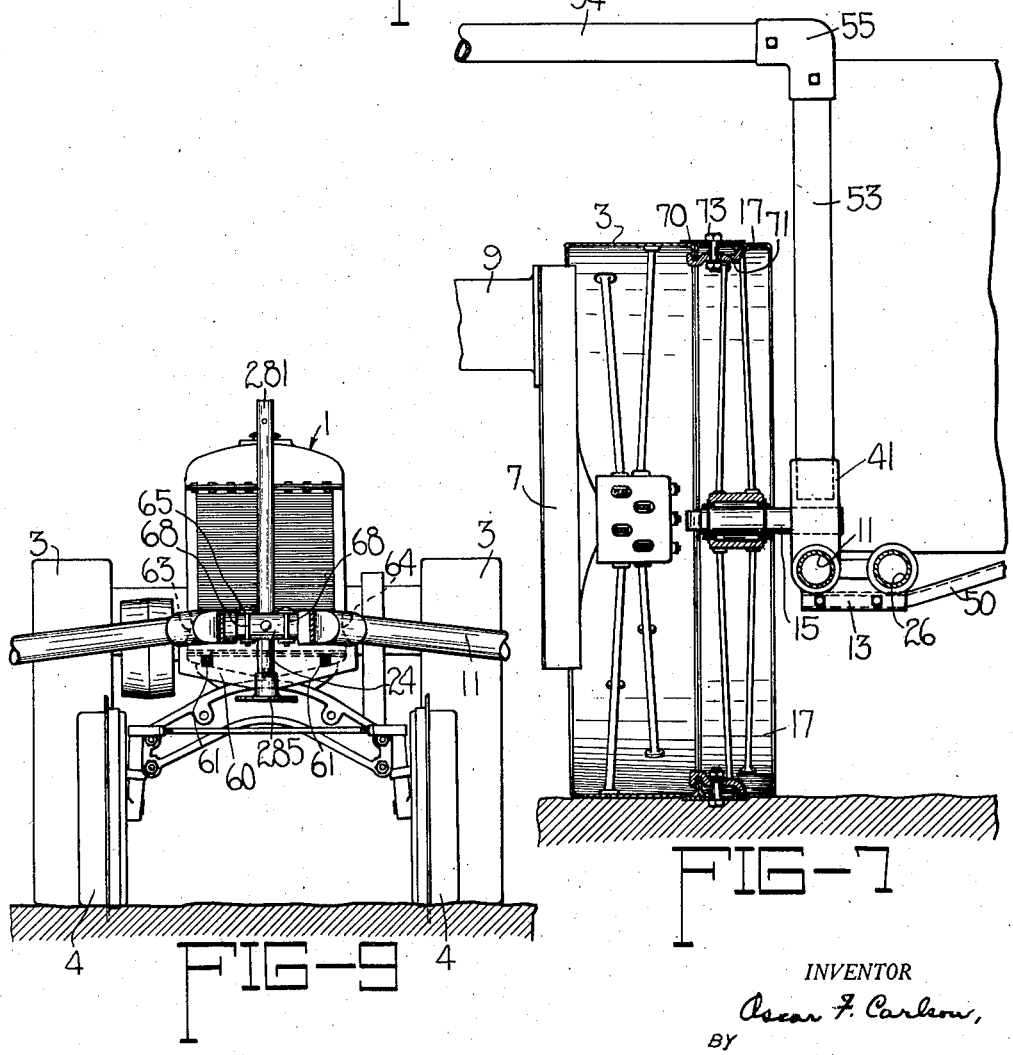
INVENTOR
Oscar F. Carlson,
BY
Brown, Jackson, Boettcher & Dienner.
ATTORNEYS.

Oct. 1, 1935.   O. F. CARLSON   2,015,708
TRACTOR PUSHED IMPLEMENT
Original Filed Aug. 20, 1931   8 Sheets-Sheet 8
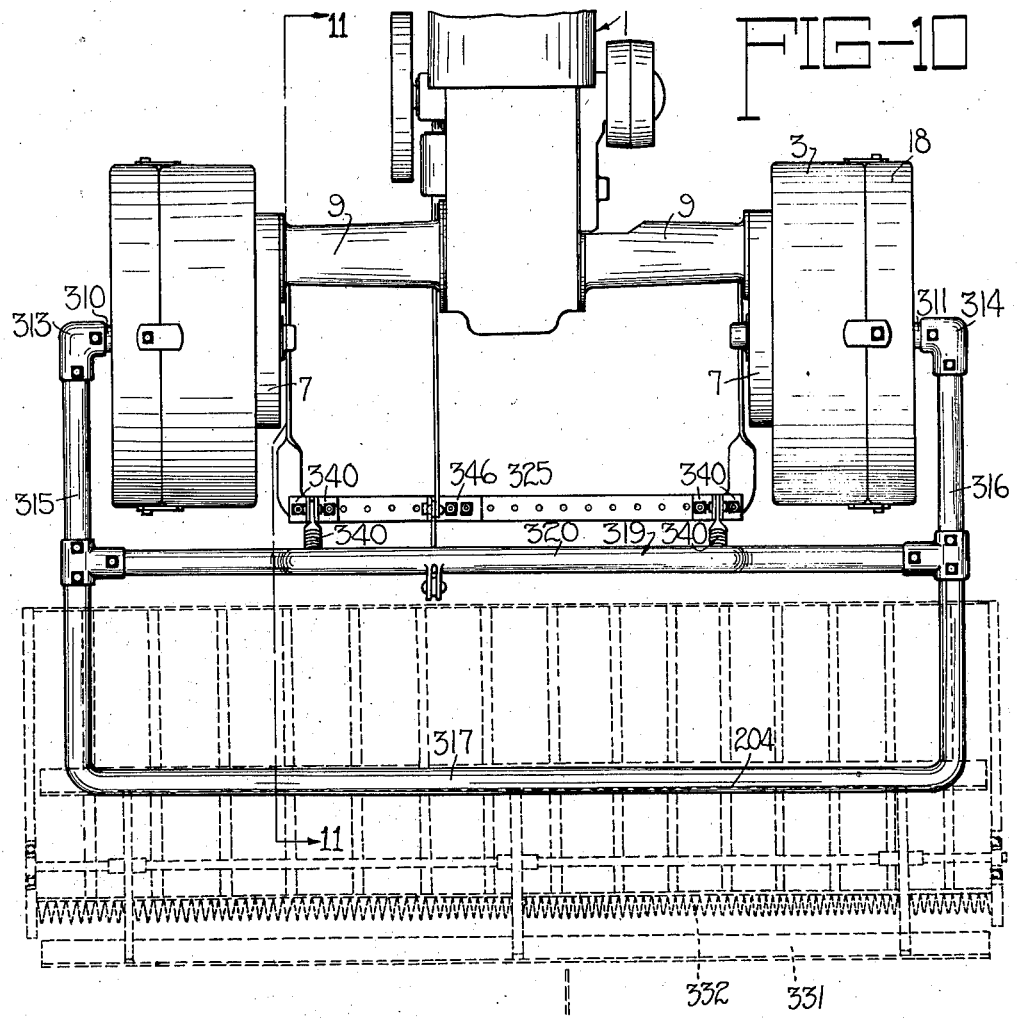
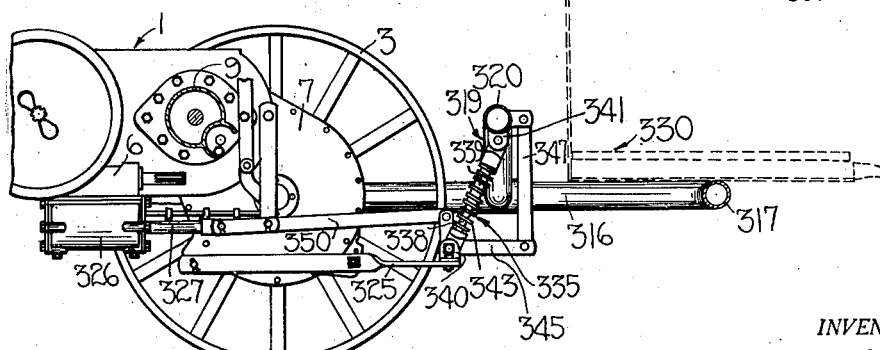
INVENTOR.
Oscar F. Carlson,
BY
Brown, Jackson, Boettcher o Dienner.
ATTORNEYS.

Patented Oct. 1, 1935

2,015,708

UNITED STATES PATENT OFFICE 2,015,708

TRACTOR PUSHED IMPLEMENT

Oscar F. Carlson, Moline, Ill., assignor to Deere & Company, Moline, Ill., a corporation of Illinois Application August 20, 1931, Serial No. 558,197
Renewed December 28, 1934

69 Claims. (Cl. 56—18)

The present invention relates generally to agricultural machines, and more particularly to agricultural machines in which an implement or implements are pushed or propelled by a tractor.

The principal object of the present invention is to provide a machine involving an implement frame so connected with the tractor that the principal part of the implement is supported directly upon its own supporting wheels, the minor portion of the weight of the implement being carried by the front portion of the tractor. The result of this particular arrangement is that the tractor is relieved of carrying all of the weight of the implement, the portion of the weight of the implement which is carried by the tractor being utilized to prevent the tractor from tipping up, as sometimes occurs under heavy draft conditions. By directly connecting the supporting wheels of the implement frame to the traction wheels of the tractor a compact and easily managed machine is provided.

The present invention also contemplates the provision of improved implement units preferably associated with such implement frame as indicated above, the implement units being individually removable so that the machine can be arranged to operate upon one, two or three plant rows at the will of the operator.

The present invention also contemplates an improved implement frame construction preferably supported upon its own supporting wheels, which may be directly connected with the traction wheels of the tractor, a portion of the weight of the implement frame and the implement carried thereby being supported upon the tractor for vertical adjustment relative thereto, whereby the vertical elevation of the implement can be adjusted. Preferably, this type of machine embodies a power lift, such as a hydraulic power lift which can be easily adjusted and set in adjusted position from the operator's station on the tractor, in which case the vertical elevation of the implement can be controlled through suitable connections with the power lift. Under certain conditions it may be desirable to support the implement frame on its supporting wheels and the draw bar of the tractor, or in other situations it may be desirable to support the implement frame on its supporting wheels and separate caster wheels or equivalent devices.

As an important feature of the last named type of machine, the present invention contemplates arranging the tractor to operate at satisfactory speed in reverse so that when the implement is mounted on its frame with its forward portion extending rearwardly with respect to the tractor, the tractor can be operated in reverse to propel the implement forwardly along the line of advance. By thus running the tractor backward to push an implement forwardly, connections between the implement and the tractor can be more easily and conveniently made and the implement can be more easily attached and detached from the tractor.

Other objects and advantages of the present invention will be apparent from the following detailed description taken in conjunction with the accompanying drawings in which:

Figure 2 is an elevation of the right hand side of the machine shown in Figure 1;

Figure 3 is an elevation showing the left hand side of the machine shown in Figure 1;

Figure 4 is an enlarged view, certain parts being shown in section, illustrating the conveyor and elevator mechanism associated with the corn picker and husker unit employing two sets of picking mechanisms, one to operate on each of two rows;

Figure 5 is a vertical cross sectional view taken approximately along the line 5—5 of Figure 1 and showing the driving connections with the various parts of the picker and husker mechanisms and the power take-off of the tractor;

Figure 6 is an enlarged plan view showing the skeleton framework forming the frame which supports the implement units;

Figure 7 is a vertical cross section showing the attachment of the implement supporting wheels to the traction wheels of the tractor and the means supporting the implement frame on its supporting wheels;

Figure 8 is an enlarged detail view showing one set of the attaching clips or lugs clamping the rim of one of the implement supporting wheels to the rim of one of the traction wheels of the tractor;

Figure 9 is a front elevation showing the attachment of the one portion of the implement frame to the forward portion of the tractor;

Figure 1:
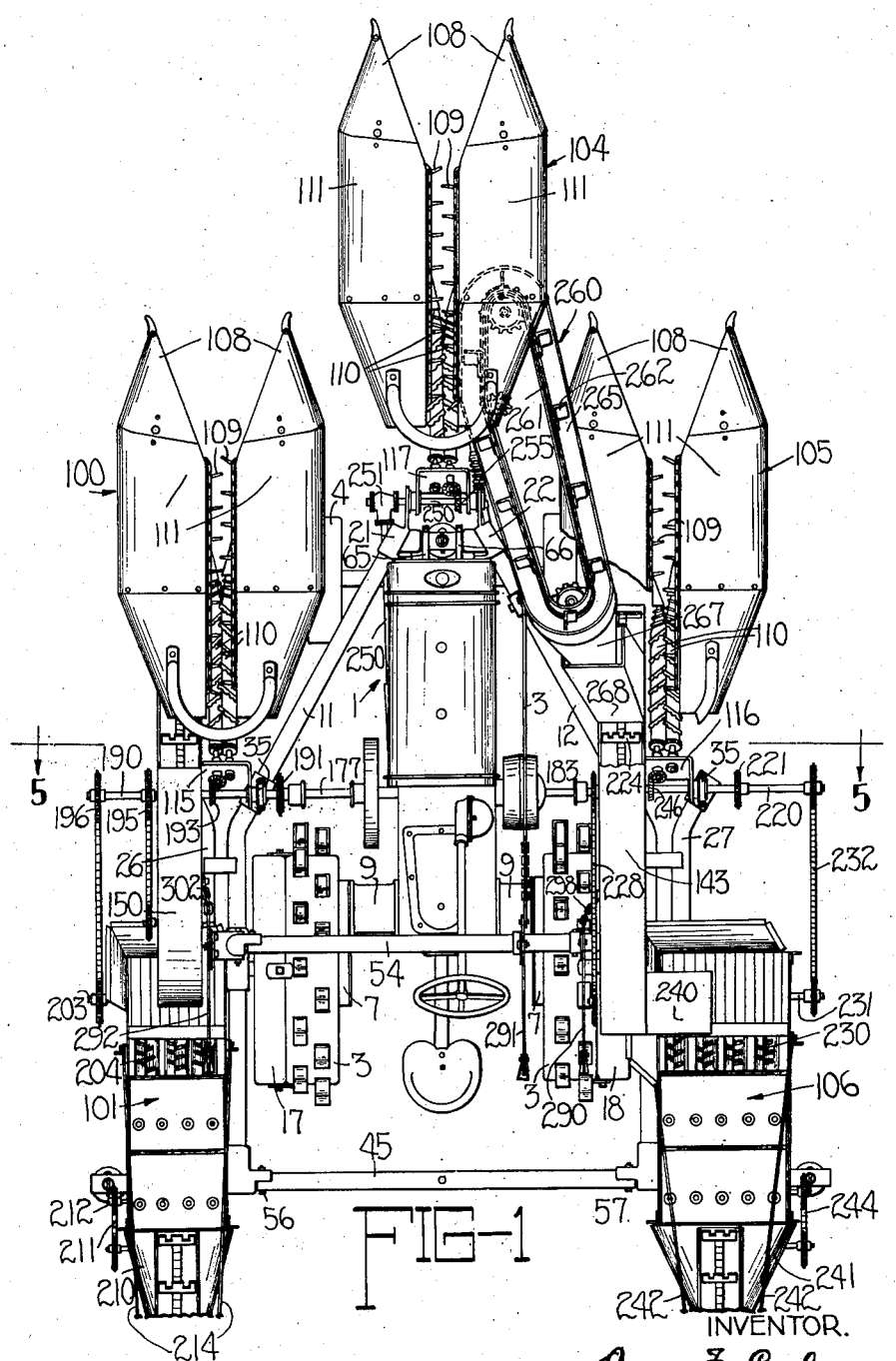
Figure 1 is a top plan view of an agricultural implement embodying certain features of the present invention and exemplifying the same in the form of a three row corn picker and husker.

Figure 10 illustrates a slightly modified form of implement frame carried upon its supporting wheels with the frame extending rearwardly of the tractor and supported upon the draw bar for vertical adjustment, the implement being shown in dotted lines with its forward portion extending rearwardly with respect to the tractor so that when the latter is driven backwardly the implement is propelled forwardly along a line of advance;

Figure 11 is a vertical cross section taken approximately on the line 11—11 of Figure 10 and showing the connection between the hydraulic power lift of the tractor and the implement frame whereby the latter can be vertically adjusted by means of the hydraulic power lift; and Figure 12 shows an implement frame structure similar to that shown in Figure 10 except instead of being supported from the draw bar of the tractor the frame shown in Figure 12 is carried by its own wheels, in addition to the supporting wheels connected directly to the traction wheels of the tractor.

Referring now more particularly to Figure 1, the reference numeral 1 indicates a tractor of the type embodying spaced apart rear traction wheels 3 and front dirigible wheels 4 spaced apart a substantial distance, as best shown in Figure 9. The tractor 1 also includes a power take-off device 6 similar to the one shown in the copending application of Edgar E. Metcalf, Serial No. 577,879, filed November 30, 1931, to which reference may be made for specific details. The rear traction wheels 3 of the tractor are journaled in chain housings 7 and are driven by countershafts (not shown) positioned within tubular extensions 9 which occupy a position forward of and above the axis of rotation of the traction wheels 3. The chain housings 7 contain sprocket chains or equivalent force transmitting means for driving the traction wheels 3 from the countershafts journaled in the extensions 9.

The implement adapted to be detachably connected with the tractor 1 and which I have chosen to illustrate the principles of the present invention is a three row corn picker, as shown in Figure 1. The implement includes a novel framework which is supported partly on the tractor and partly on separate wheels which are adapted to be clamped to the rear traction wheels of the tractor, thus forming extension rims for the traction wheels of the tractor. The various implement units are carried by this framework which will now be described.

Turning now to Figure 6, the various picker and husker units are mounted on a frame comprising fore and aft extending pipes or frame bars 11 and 12. Intermediate their ends the frame bars 11 and 12 carry castings 13 and 14 which are suitably formed to embrace the bars and to be bolted thereto. These castings are also adapted to receive short inwardly extending stub shafts 15 and 16 on which the implement supporting wheels 17 and 18 are journaled. These wheels are of the same size as the traction wheels 3 of the tractor and are adapted to be securely clamped thereto, as best shown in Figures 7 and 8 by means which will be described later.

The frame bars 11 and 12 are formed to converge forwardly and are connected together by means of two castings 21 and 22 formed to receive the forward end of the bars 11 and 12 and a short transverse connecting bar 24. The castings 13 and 14 also receive auxiliary frame bars 26 and 27 which have their forward ends outturned, as indicated at 29 and 30. The forward end of each of these auxiliary frame bars 26 and 27 receives a casting member 32, and similar members 33 are supported on the frame bars 11 and 12 adjacent the castings 32. Implement supporting standards 35 are carried by the members 32 and 33, and a similar pair of standards 36 is carried by the castings 21 and 22.

The longitudinal frame bars 11 and 12 are extended rearwardly beyond the supporting wheels 17 and 18 and have suitable castings 40 and 41 bolted thereto. These castings are formed to receive a transverse connecting bar or pipe 45 and a pair of short laterally extending pipes or bars 46 and 47. The castings 13 and 14 also receive laterally extending angle bars 50 and 51 and vertical angle members 53. A second transverse connecting bar 54 is joined to the upper ends of the vertical bars 53 by suitable castings 55, see Figures 6 and 7. The frame bars 53 and 54 constitute an upper arched frame member which is arranged to pass above the tractor. The transverse connecting member 45 is connected to the castings 40 and 41 by removable bolts 56 and 57.

It will thus be seen that the forward ends of the longitudinal frame bars 11 and 12 constitute, in general, a U-shaped frame having its rear arms supported upon the supporting wheels 17 and 18. The rear ends of the longitudinal frame bars 11 and 12, together with the transverse member 45, also form a U-shaped frame having its arms extending forwardly and supported by the supporting wheels 17 and 18.

By removing the transverse connecting member 45 the tractor may be driven in between the longitudinal frame bars 11 and 12 for the purpose of attaching the implement frame to the tractor. Since the connecting member 54 is arched upwardly far enough so that it will clear the top of the tractor, this member need not be detached. As soon as the tractor is in position between the frame bars 11 and 12 with its front end adjacent the front portion of the frame the rear traction wheels of the tractor will be directly adjacent the supporting wheels 17 and 18 of the implement frame.

The forward or converged ends of the frame bars 11 and 12 are supported on the front end of the tractor 1 by means of a plate 60 bolted to the front portion of the tractor, as by bolts 61. The upper corners of the connecting plate 60 are notched, as shown at 63 and 64 in Figures 4 and 9, to receive the frame bars or pipes 11 and 12. A pair of U-shaped brackets 65 are fixed to the plate 60 and the arms of these brackets are arranged to receive and embrace the short connecting frame bar or pipe 24. Pins 68 inserted in registering holes in the brackets serve to hold the front end of the vehicle frame in position at the front of the tractor.

The supporting wheels for the implement frame 11 and 12 are of the same size as the traction wheels 3 of the tractor and are adapted to be fixed thereto by a plurality of clamping means best shown in Figures 7 and 8. Each clamping means comprises an outer clip 70 and an inner clip 71. The outer clip 70 is in the form of a flat plate having an opening therein and receiving a clamping bolt 73 the head of which is positioned against the plate 70. The inner clip 71 is in the form of a lug having one bent end 74 to abut against the inner circumference of the rim of the vehicle wheel 17 and another end 75 formed with a hook portion 76 formed to embrace the adjacent flanges on the wheels 3 and 17. The outer clip or plate 70 extends over the threads of the two connected wheels while the other clip 71 is formed with an enlarged bore 78 receiving the threaded end of the bolt 73.

The rim of the wheel 17 is formed with a transverse slot 80 to receive the clamping bolt 73. The slot 80 is of sufficient length that the plate member 70 can be moved from engagement with the traction wheels 3 by simply loosening the bolt 73 and slipping the lug toward the right hand edge of the rim 17, as shown in Figure 8, this being possible after the nut 82 has been backed off far enough to permit the lug 71 to be disengaged from the meeting flanges of the two connected wheels. Preferably the bolt 73 is long enough to allow this to occur without having to take the clamping means entirely off of the wheel 17. The other supporting wheel 18 is arranged to be connected to the other rear traction wheel of the tractor in the same manner.

It will be apparent that after the supporting wheel has been clamped to its traction wheel, the two rims act together to support the weight of the tractor and the implement. The two wheels turn together and, in actuality, provide, first, improved traction for the drive wheels of the tractor and, second, provide a bearing or support for the principal portion of the weight of the implement without subjecting any of the tractor parts, other than the traction wheels, to the weight of the frame and implement. In the sense, therefore, that one wheel supports the rear of the tractor and the other wheel supports the rear and major portion of the implement, each wheel supplements the other in performing these functions.

The framework comprising the longitudinal bars 11 and 12 and associated frame members is adapted to receive and support implement units thereon. While it is to be understood that the present invention is not to be limited to any particular kind of implement to be associated with the framework 11 and 12, I have chosen for the purpose of best illustrating the principles of the present invention to illustrate the application of a plurality of corn picker and husker units as one possible type of implement which best illustrates the invention.

Referring now to Figure 1, it will be observed that I have provided an implement carried on the left side of the frame and including a picker unit 100 and a husking unit 101 while on the other side of the frame and the tractor I have mounted an implement comprising a pair of picker units 104 and 105, both delivering corn to one husking unit 106. The picking and husking units per se form no part of the invention, except in the combination shown. The picker units 100, 104 and 105 are substantially of the form shown in Patent No. 1,967,498, issued July 24, 1934, to Wilbur J. Coultas and Norman F. Andrews for a corn harvester, to which reference may be made for specific details of the picking mechanism and associated structure. It will be sufficient to note here that each of the picker units embodies suitable gatherer arms 108, stalk conveying chains 109, snapping rolls 110 and shields or guards 111. Each of the picker units is pivoted to the implement frame for vertical swinging movement about an axis which coincides with the axis of the driving shaft or shafts operating the various picker units.

The frame of the picker unit 100 is pivotally supported by trunnions journaled in the upper ends of the standards 35 at the left hand side of the implement frame. The picker unit 105 on the other side of the frame is supported in a similar manner for vertical movement about a transverse axis. The trunnions of the two picker units 100 and 105 are carried by plates or brackets 115 and 116, respectively, forming part of the frames of the picker units. These brackets also form the frames for supporting the upper ends of the snapping rolls 110. The snapping rolls 110 of the intermediate picking unit 104 are journaled at their upper ends in a bracket or plate 117 which, like the brackets 115 and 116, carry the trunnions for the intermediate unit which are journaled in the upper ends of the standards 36 secured to the castings 21 and 22, respectively, as shown in Figure 6.

It will thus be seen that each of the picker units 100, 104 and 105 is supported for up and down swinging independently of one another. Each of the picker units is counterbalanced by means of a resilient connection best shown in Figure 4 which illustrates the counterbalancing means for the intermediate picker unit 104. As there shown, the casting member 22 carries a depending strut 120 to the lower end of which a casting 121 is secured. The casting 121 is formed with suitable apertured ears to pivotally receive the rear end of a tubular rod 123. A second rod 124 telescopes within the rod 123 and has its forward end pivotally connected with the forward portion of the picker unit 104, as by a pivot pin 126. A comparatively strong spring 130 is biased between an abutment 131 secured to the rod 123 and an abutment 132 secured to the other rod 124. The force of the spring 130 is sufficient to counterbalance the weight of the picker unit and to hold the same with its forward end in proper relation to the ground. The strut 120 is braced by means of a link 135 connected at one end with the casting 121 and at its other end with a collar 136 secured to the frame bar 12 at a point in rear of the casting 22.

The other picker units are supported in substantially the same manner. For example, the picker unit 105 is supported in proper relation by a pair of telescoping rods 140 and 141, the latter being pivotally connected to the bottom shoe of the elevator 143 associated with the picker unit 105 and the other rod 140 being pivotally connected to a bracket 144 carried by the casting 32 on the auxiliary frame bar 27. A spring 145 is utilized for sustaining the weight of the forward portion of the picker unit 105.

The picker unit 100 on the left hand side of the machine is supported in substantially the same manner. The casting 32 includes a depending bracket 149. Between this bracket and the elevator 150 for the picker unit 100 telescoping rods 151 and 152 are provided, the weight of the forward portion of the unit 100 being supported by a spring 154.

Reference has been made to the driving mechanism for the picker units as including a drive shaft which is journaled on an axis coincident with the pivotal axis of the picker units. The driving mechanism for the various units will now be described. The tractor 1 includes a more or less conventional form of power take-off indicated by the reference numeral 6. The housing of the power take-off 6, as best illustrated in Figure 5, includes a bolting flange 161 by means of which various operating mechanisms may be attached to and driven by the power take-off. One common form of such operating mechanism which is in wide use is a form of power lift embodying a swinging crank which is utilized to raise and lower operating tools on the implement which is being propelled. The present invention contemplates, however, dispensing with this more or less common form of operating mechanism and substituting therefore a second housing 162 in which a shaft 163 is journaled and which receives its power from the power take-off shaft 164 of the power take-off 6. By means of bevel gears or the like the shaft 163 drives a transverse shaft 168 which carries universal joints 171 and 172 at its ends. The picking mechanism of the unit 100 and associated structure are driven from a jack shaft 173 supported in the depending bracket 149 and a corresponding bracket 174 carried by the casting 33. The jack shaft 173 is driven from the transverse shaft 168 through a universal joint 176 and a short shaft 177 connected between the universal joints 172 and 176.

The picker unit 105 at the other side of the machine is driven in a similar manner. A jack shaft 180 is carried in the bracket 144 and a corresponding bracket 181 depending from the casting 33 on that side of the machine. The jack shaft 181 is driven from the transverse driving shaft 168 through a connecting shaft 183 connected at one end with the universal joint 171 and at its other end with a universal joint 184 on the inner end of the jack shaft 180.

The mechanism of the left hand implement unit includes, as has been previously pointed out, snapping rolls 110, associated conveying chains 109 and an elevator 150. The husking box 101, see Figure 1, carried by the frame bars 46 and 50, also forms a part of the left hand implement unit, and the means for driving the various operating parts of this implement unit from the jack shaft 173 will now be described. A shaft 190 is journaled in the upper ends of the standards 35 for rotation about an axis which is coincident with the axis of pivotal movement of the bracket 115 supporting the upper end of the picker unit 100. The shaft 190 is driven from the jack shaft 117 through a sprocket and chain drive indicated in its entirety by the reference numeral 191. The snapping rolls are driven from the shaft 190 through bevel gears 193, see Figures 1 and 5. The outer end of the shaft 190 carries a pair of sprockets over which sprocket chains 195 and 196 are trained, as best shown in Figure 1. The chain 195 serves to drive a shaft 198 journaled at the upper end of the elevator 150 which, in turn, drives the conveyor chain 199 thereof and the flights 200. The sprocket chain 196 drive a shaft 203 which operates the husking mechanism, including the husking rolls 204, of the husking unit 101. The husking unit includes a rearwardly extending elevator mechanism 210 which is driven by a chain 211 operated from a shaft 212 extended outside of the husking box 101, see Figures 1 and 3. The upper end of the elevator 210 is braced and supported by a pair of tension rods 214.

As has been pointed out previously, the implement unit at the right hand side of the machine includes two picking units 104 and 105 and a husking unit 106, suitable elevator and conveyor mechanisms of the picker unit 105 and the husker unit 106 being provided so that both of the picker units deliver the snapped corn to the husker unit 106. The latter is carried on the implement frame on the frame bars 47 and 51. The various operating mechanisms are all driven from the jack shaft 180 at the right hand side of the machine. A shaft 220, see Figure 5, is journaled within the trunnions carried by the standards 35 and is positioned in approximate alignment with the shaft 190 at the other side of the machine and which, as just described, drives the mechanisms making up the left hand implement unit. The shaft 220 is driven from the jack shaft 180 through a sprocket and chain assembly indicated in its entirety by the reference numeral 221. The elevator 143 leading from the picker unit 105 to the husker unit 106 includes a chain 223 and paddles or flights 224 driven from a shaft 225 at the upper end of the elevator. This shaft is driven through a sprocket chain 228 trained over a sprocket on the shaft 225 and around a second sprocket secured to the inner end of the driving shaft 220. The mechanism of the husking box 106, including the husking rolls 230, is driven by a shaft 231 connected through a sprocket and chain drive 232 extending between the shaft 220 and the shaft 231. The elevator 143 includes a lateral chute 240 which is arranged to divert the ears of corn laterally into the mechanism of the husking box 106. The latter discharges into a rearwardly extending elevator 241, the rearward end of which is supported by tension links 242. The elevator 241 is driven from the mechanism of the husking box 106 by means of a sprocket and chain drive 244. The snapping rolls 110 of the picker unit 105 are driven by a bevel gear arrangement 246 from the shaft 220.

The forward and intermediate picker unit 104 is driven from the power take-off shaft 164 (Figure 5) through a telescoping shaft 250 connected by a universal joint (not shown) with the front end of the power shaft 164. The telescoping shaft 250 is connected by means of a pair of bevel gears enclosed in a housing 251 with a transverse drive shaft 253 which is similar in function and operation to the shafts 190 and 220. The snapping rolls 110 of the picker unit 104 are driven through a pair of bevel gears 255.

An elevator or conveyor mechanism, indicated in its entirety by the reference numeral 260, is operative to remove ears of corn from the snapping rolls 110 of the intermediate picker unit 104 and convey them rearwardly and laterally to a point to deposit them in the elevator 143 associated with the right hand picker unit 105. The elevator or conveyor 260 includes a chain 261 having paddles or flights 262 thereon, the chain being driven from the same mechanism which drives the gatherer chains. The elevator chain 261 operates in a suitable trough or way 265, the rear end of which is provided with a hinged chute 267 which telescopes with a lower chute section 268 hingedly connected to the lower end of the elevator 143 associated with the right hand picker unit 105. The ears of corn carried up from the intermediate picker unit by the elevator or conveyor 260 are thereby deposited in the lower end of the elevator 143. The elevator 143 therefore not only delivers ears of corn picked by the picker unit 105 to the husking box or unit 106, but also those picked by the picker unit 104. It is to be noted that the husking box 106 is of greater capacity than the husking box 101 for the reason that twice as many ears are delivered to it under normal conditions. The telescoping chute structure 267 and 268 is advantageous in permitting the picker units 104 and 105 to have independent pivotal movement in traversing the field.

Mention has been made previously of the fact that the tractor 1 can be easily and conveniently attached and detached from the implement frame. When detached from the tractor and because it has only two supporting wheels 17 and 18 it is necessary to provide some sort of auxiliary supporting means for the implement to maintain the units off of the ground when not attached to the tractor. The means I have provided to this end is shown in Figure 6. Such means includes three legs 281, 282 and 283 vertically adjustable with respect to and carried by the transverse frame bars 24, 46 and 47, respectively. Each of the legs includes a foot portion 285 having a substantial area for contact with the ground. The legs are vertically adjustable in the bars with which they are associated and are adapted to be held in either an upper or a lower position by means of pins 287 insertable through the associated frame bars and selected holes in the legs themselves.

When the implement is to be disconnected from the tractor the three legs are lowered and then the several connecting means comprising the clips or lugs 70 and 71 are removed, thus disconnecting the implement supporting wheels from the traction wheels of the tractor. The driving connections to the cross shaft 168 may be disconnected at the universal joints 171 and 172 and the drive shaft 250 (Figure 1) may be disconnected at its universal joint connection with the power take-off shaft 164. The cross brace or reenforcing frame bar 45 is disconnected by removing the bolts 56 and 57, and the front plate 60 can be detached from the front end of the tractor by removing the bolts 61 or the pins 68 can be removed, freeing the frame bar 24. When this is done the tractor is entirely free from the implement and its frame and may be backed rearwardly away therefrom, the implement being supported on its wheels 17 and 18 and the foot members 281, 282 and 283.

Reference has been made to the independent pivotal movement of each of the picker units. In order to manually control and adjust the vertical position of each of the picker units the transverse frame bar 54 carries three adjusting levers 290, 291 and 292, see Figure 5. These levers are pivotally connected to suitable quadrants 294, 295 and 296, respectively, the quadrants being fixedly secured to the frame bar 54. The lever 290 is connected by a chain 298 with the elevator 143 so that operation of the lever 290 raises and lowers the forward end of the picker unit 105. The lever 291 is connected by means of a chain 299 and a link 300 with the elevator 260 of the forward picker unit 104, whereby operation of the adjusting lever 291 controls the vertical position of the forward end of the picker unit 104. The adjusting lever 292 is connected by a link 302 to the elevator 150 whereby the vertical position of the forward end of the left hand picker unit 100 can be controlled. All of the adjusting levers are accessible from the operator's station on the tractor.

While the feature of supporting a portion of the weight of the implement on the front end of the tractor with the principal portion of the weight of the implement carried directly upon the supporting wheels has a number of advantages, under certain conditions it may be desirable to support the front end of the implement frame on one or a pair of caster wheels instead of carrying the weight thereof on the tractor directly. In such an arrangement the corn picker will be free to rise and fall relative to the tractor. This means of supporting the implement units is useful where the fields are rough and uneven.

The three-row corn picker and husker shown in Figure 1 can be readily converted to either a two-row or a one-row machine. By removing the left hand implement unit, comprising the picker unit 100, the elevator 150 and the husker unit 101, the picker units 104 and 105 and the associated husking unit 106 are retained, thus constituting a two-row corn machine. On the other hand, if the right hand implement unit, comprising the two picker units 104 and 105 and the husker unit 106, is removed, leaving only the left hand implement unit in place, the resulting machine is a one-row corn picker. This is a feature which makes the machine adaptable for widely different crop and ground conditions and is an important feature of the present invention.

In connection with an agricultural machine embodying an implement frame which is journaled upon its own supporting wheels which are adapted to be directly connected with the traction wheels of a tractor the present invention contemplates a slightly different form of framework than that described above. Referring now more particularly to Figures 10 and 11, the tractor 1 includes rear traction wheels 3, as in the above described construction, these traction wheels being journaled in chain housings and driven from countershafts journaled within the tubular extensions 9. Implement supporting wheels 17 and 18 are journaled upon stub axles 310 and 311, the latter being carried by castings 313 and 314 secured to one end of the longitudinal frame bars 315 and 316. These frame bars are connected together by means of a transverse portion 317 and a transverse frame bar 319 which preferably includes an upwardly arched portion 320.

In this modification the tractor 1 is shown as provided with a fixed draw bar or support 325 which is U-shaped and has the arms thereof securely pinned or bolted to the chain housings 7. The tractor 1 also includes a hydraulic lift structure 326 of the type embodying a movable piston 327 actuated from the power of the tractor and movable under the control of the operator to take and retain any one of a number of adjusted positions. The present invention is not primarily concerned with the specific details of the hydraulic lift structure per se, it being sufficient to note that the hydraulic lift illustrated is substantially identical with that shown in a copending application by Harold Brown, Serial No. 503,887, filed December 22, 1930.

The implement frame comprising the frame bars 315, 316, 317 and 320 is adapted to support any one of a number of different agricultural implements, depending upon the nature of the work to be performed. In order, however, to illustrate the present invention, I have shown in dotted lines an implement 330 in the form of a windrower which includes a rotatable reel 331 and forwardly projecting cutting elements 332, as is well known in the art. Generally, the operating mechanism of the implement 330 is driven from the power take-off 6 of the tractor 1.

The implement frame is yieldingly carried from the draw bar 325 of the tractor by means of a pair of spring mechanisms 335 similar in essential details to the spring mechanisms supporting the forward ends of the picker units shown in Figure 1. More specifically, the spring mechanisms 335 each includes a pair of telescoping members 338 and 339 pivotally connected, respectively, with the draw bar 325 and the arched portion 320 of the frame bar 319 by suitable brackets 340 and 341. A spring 343 is arranged to yieldingly support the weight of the implement frame and the implement thereon.

The height at which the implement 330 carried by the frame is positioned above the ground is controlled through connections to the power lift 326 of the tractor. These connections are also operative to aid the spring 343 in supporting the weight of the implement frame and the implement thereon. These connections comprise a bell crank 345 fulcrumed on the draw bar 325, as by being pivoted to a bracket 346 bolted to the draw bar, a link 347 connected with arm of the bell crank 345 and the transverse frame bar 319, and a second link 350 connected with the other arm of the bell crank 345 and the piston 327. Movement of the piston 327 operates to raise or lower the frame relative to the tractor and to retain the same in that position.

This adjusting mechanism just described is particularly desirable in connection with a windrowing machine or grain harvester where it is desirable to adjust the height of the cutter bar 332. By utilizing the hydraulic power lift 326 the height of the cutter bar can be adjusted to any position without stopping or slowing up the machine. Obviously, of course, implements other than a windrower or a grain harvester can be secured to and supported by the implement frame. When the hydraulic lift 326 is operated to adjust the height of the implement the frame pivots about the axis of the implement supporting wheels 17 and 18.

In connection with the implement shown in Figures 10 and 11 and just described, it is important to note that the implement is propelled forwardly along the line of advance by running the tractor backwardly. This can be easily accomplished by operating the tractor in reverse, one of the advantages of this arrangement being that the connections between the implement frame and the tractor can be made quite simple and easy to connect and disconnect.

Under some conditions it may not be desirable to support the weight of the implement entirely on the tractor and the implement wheels. To meet such conditions the present invention also contemplates the provision of caster wheels instead of a connection to the draw bar of the tractor as illustrated in Figure 11. Figure 12 shows how caster wheels can be employed, and in Figure 12 the reference numeral 360 indicates a vehicle frame similar to that shown in Figure 10 which is substantially U-shaped and provided with stub axles on which is journaled implement supporting wheels such as are indicated by the reference numerals 17 and 18 in Figures 1 and 10. In Figure 12 the U-shaped frame bar 360 includes a transverse portion 361 to which is secured one or more castings 363 which are vertically slidable relative to spindles 365. These spindles include bent portions upon which are journaled caster wheels 366. An implement 368 of any desired type is secured to the frame, the latter being adjustable vertically on the vertical portions of the caster wheel spindles 365.

The implement frame carries one or more bell cranks 370 having one arm pivoted to the frame and swiveled to the upper ends of the spindles 365, the other arm of each of the bell cranks 370 being connected through links 371 to a swinging link or bail member 373, the latter being connected through a short link 375 with the piston 327 of the hydraulic power lift. The operation of the hydraulic power lift, as illustrated in Figure 12, is controlled by means of a lever 376 which operates the control valves of the hydraulic power lift. As is apparent, when the swinging link or bail member 373 is operated by the power lift the implement 368 is raised or lowered along the vertical portions of the spindles 365. To aid in raising and lowering the implement counterbalancing springs 380 are provided.

While I have shown and described the preferred structure in which the principles of the present invention are embodied, it is to be understood that my invention is not limited to the specific means shown and described but that, in fact, widely different means may be employed in the practice of the broader aspects of my invention as defined in the appended claims:

What I claim, therefore, and desire to secure by Letters Patent is:

1. An agricultural machine comprising, in combination, a tractor having a pair of spaced apart rear traction wheels, a generally U-shaped implement frame, means connecting the arms of said U-shaped frame with said traction wheels, means holding the implement frame in proper vertical position relative to the tractor, and an implement mounted on said frame and carried thereby.

2. An agricultural machine comprising, in combination, a tractor having traction wheels, an implement including a frame, means supporting one portion of the frame on the front of the tractor, and means directly connected with the traction wheels for supporting the other portion of said frame directly thereon.

3. An agricultural machine comprising, in combination, a tractor having rear traction wheels, an implement frame including fore and aft extending frame bars, supporting means for the frame including supporting wheels connected with the traction wheels of the tractor, said frame being journaled on said supporting wheels, means connecting the front portion of said implement frame with the front of the tractor, and a plurality of implements carried by said frame.

4. An agricultural machine comprising, in combination, a tractor having rear traction wheels, an implement supporting frame connected with said tractor and including supporting wheels and fore and aft extending frame bars journaled on said supporting wheels, means directly connecting the supporting wheels to the traction wheels of the tractor, the frame bars of the implement frame converging forwardly, means connecting the forward ends of the frame bars to the tractor, removable cross brace means connecting said frame bars, said frame being adapted to be removed from the tractor by backing of the latter when said removable cross brace is detached, and separate supporting means for said frame when the tractor is detached.

5. In a tractor pushed implement, the combination of a tractor having traction wheels, fore and aft extending frame bars constituting an implement frame, castings secured to said bars intermediate their ends, journal means on said castings, supporting wheels carried by said journal means, an implement carried by said frame, said supporting wheels being arranged to support the principal part of the weight of said frame and implement, and means connecting the forward ends of said frame bars to the forward portion of the tractor so that a portion of the weight of the implement frame and the implement thereon is supported upon the front end of the tractor.

6. In a tractor propelled implement, the combination of a tractor having traction wheels, an implement frame comprising fore and aft extending frame bars and transverse connecting bars, castings carried by said fore and aft frame bars and carrying journal means, implement supporting wheels carried by said journal means, said wheels being adapted to be directly connected to the traction wheels of the tractor, auxiliary bars carried by said castings, two implement units supported by said auxiliary frame bars and the adjacent fore and aft bars, and means connecting the forward ends of the fore and aft frame bars with the tractor forward of said traction wheels.

7. In a tractor propelled agricultural machine, the combination of a tractor having rear traction wheels and a power take-off, a supporting frame comprising longitudinal and transverse frame bars, journal means secured to said bars, and supporting wheels carried by said journal means, means connecting said supporting wheels to said traction wheels to rotate therewith, means connecting the forward ends of the longitudinal frame bars with the forward end of the tractor, said longitudinal frame bars converging forwardly to the point of said connection, an implement unit carried on said frame bars adjacent each of said supporting wheels, another implement unit carried by said frame bars near the ends of said converged bars, and driving connections between each of said implements and the power take-off of the tractor.

8. An implement adapted to be detachably connected with and propelled by a tractor having rear traction wheels, said implement comprising fore and aft extending frame bars spaced apart rearwardly and converging forwardly, a supporting wheel journaled on each of said bars near the rear end thereof and arranged for detachable connection with said rear traction wheels of the tractor when the latter is driven in between the frame bars, means connecting the forward ends of said bars to the front of the tractor, implement mechanism supported adjacent each of said supporting wheels, and a transverse connecting and reenforcing bar detachably connected with the rear ends of said first mentioned bars and adapted to be attached to said bars after the tractor and frame have been connected together.

9. An agricultural machine comprising, in combination, a tractor having rear traction wheels, an implement frame including fore and aft extending frame bars spaced apart rearwardly and converging forwardly and adapted to embrace the tractor as a whole, means connecting the forward converged ends of said bars to the front of the tractor, implement supporting means journaled on said bars near their spaced apart ends and arranged to be directly connected with said traction wheels to rotate therewith, an auxiliary frame bar connected with and supported adjacent one of said fore and aft extending frame bars, vertical standards carried by said auxiliary and fore and aft frame bars, a corn picker unit pivotally supported on said standards for vertical movement, a husker unit arranged to receive ears of corn from the picker unit, means supporting the husker unit on said implement frame in rear of the picker unit, and means for driving both of said units from the power of the tractor.

10. An agricultural implement comprising, in combination, a tractor having spaced apart rear traction wheels, and forward supporting wheels, a triangular frame structure arranged to embrace the tractor and having its forward apex supported on the front of the tractor and its rear portion supported by means connected with said traction wheels and implement means carried by said frame.

11. An agricultural machine comprising, in combination, a tractor having rear traction wheels, an implement frame including fore and aft extending frame bars converging forwardly and spaced apart rearwardly, supporting wheels journaled on said spaced apart portions of the frame bars and arranged to be directly connected to said rear traction wheels, an auxiliary frame bar connected with and carried by one of said first named frame bars, a pair of vertical standards carried by said auxiliary and fore and aft extending frame bars, another pair of standards supported at the forward converged ends of said fore and aft extending frame bars, a corn picker unit pivotally supported in said first named pair of standards and including a rearwardly extending conveyor arranged to receive ears from the picking mechanism, a second corn picker unit pivotally supported in the second pair of vertical standards and including conveyor means adapted to receive ears of corn from the picking mechanism and to convey them rearwardly to the elevator of said first mentioned corn picker unit, a husker unit arranged to receive the ears of corn from both of said picker units through said elevator and arranged adjacent the discharge end of the latter, and means driving said conveyor, said elevator, and all of said units from the power of the tractor.

12. An agricultural machine comprising, in combination, a tractor, an implement frame supported by said tractor, a corn picker unit pivotally supported at the forward end of said frame, conveyor mechanism associated with said unit and extending laterally and rearwardly therefrom and arranged to receive ears of corn from the picking mechanism of said unit, a second corn picker unit pivotally carried by said frame rearwardly and laterally of said first named unit and including a rearwardly extending elevator adapted to receive ears of corn from the second picker unit and to convey them rearwardly, a telescoping chute connection between said conveyor and said elevator whereby the conveyor discharges ears of corn from said first unit into the elevator of said second unit whereby said elevator conveys ears of corn from both of said units rearwardly, and husking mechanism carried by said frame and receiving the ears of corn from said elevator.

13. An agricultural machine comprising, in combination, a wheel supported frame, a first picker and husker unit carried by the frame and including picking mechanism, an elevator receiving ears of corn from said mechanism and conveying them rearwardly, a husking mechanism into which said elevator discharges, a second picker and husker unit carried by said frame and including a pair of picking mechanisms, a single husking mechanism, and means conveying ears of corn from both of said picking mechanisms to said husking mechanism, and means detachably connecting said first and second units with said frame whereby the machine can be converted into a two row or a one row machine by removing either the first or the second unit.

14. An agricultural machine comprising, in combination, a tractor having rear traction wheels and a draw bar, an implement frame comprising frame bars and supporting wheels of the same diameter as the traction wheels of the tractor and arranged to be directly connected therewith, means supporting the implement frame on the draw bar of the tractor, an implement carried by said implement frame, and means for raising and lowering the implement frame relative to the tractor.

15. An agricultural machine comprising, in combination, a tractor having traction wheels and a hydraulic lift, an implement frame including spaced apart frame bars having inwardly extending journal means, supporting wheels rotatably mounted on said journal means and adapted to be directly connected with the traction wheels of the tractor, means supporting the frame on said draw bar, an implement carried by said frame, and means fulcrumed on said draw bar and connected with said hydraulic lift for raising and lowering the implement frame relative to the tractor.

16. In an agricultural machine including a pair of supporting wheels substantially of the same diameter and adapted to rotate together, both of said wheels having rims with radially inwardly directed flanges, and means for clamping said wheel rims together, said means comprising a lug on the inside of said wheels and including a portion embracing adjacent flanges and another portion seated against one of said rims on the inside thereof, there being a slot formed in said rim, a plate member on the outside of said rims and arranged to overlap the meeting edges of said rims, and means for clamping the first named portion of said lug around the adjacent flanges of the rims comprising bolt means passing through said plate member, said slot, and said lug intermediate the first and second portions thereof.

17. In an agricultural implement arranged for detachable connection with a tractor and comprising fore and aft extending frame bars and supporting wheels journaled on said bars intermediate their ends and adapted to be directly connected with the traction wheels of the tractor, means for supporting the implement frame when detached from said tractor, said means comprising a vertically adjustable foot member carried by said frame at a point spaced from the axes of said supporting wheel.

18. An agricultural machine comprising a tractor having supporting wheels and driving connections arranged with reverse mechanism for driving the tractor rearwardly, an implement frame including sections disposed on opposite sides of the tractor and adjacent certain of said wheels, implement supporting wheels for said frame and adapted to be directly connected with said last named tractor wheels, an agricultural implement mounted on said frame with its forward portion directed rearwardly of the tractor, whereby when the tractor is driven in reverse the implement is propelled forwardly along the line of advance.

19. An agricultural machine comprising a tractor having rear traction wheels and driving connections therefor arranged with reverse mechanism for driving the tractor rearwardly, an implement frame, spaced apart supporting wheels journaled on the frame and arranged for direct attachment with said traction wheels, means spaced from the journal axis of said supporting wheels for maintaining said frame in proper vertical position, an agricultural implement mounted on said frame with its forward portion directed rearwardly of the tractor, whereby when the tractor is driven in reverse the implement is propelled forwardly along the line of advance.

20. An agricultural machine comprising, in combination, a tractor having rear wheels, an implement frame, means connected directly with the rims of said rear wheels for supporting a portion of said implement frame, means for supporting the other portion of said frame from the front of the tractor, and an implement mounted on said frame.

21. In a tractor pushed implement, the combination of a tractor having traction wheels, fore and aft extending frame bars constituting an implement frame, journal means connected with said bars intermediate their ends, supporting wheels carried by said journal means and arranged to support a substantial part of the weight of said frame and implement, an operating unit carried by said implement frame adjacent the forward ends of said frame bars, a second operating unit carried by said frame bars adjacent their rear ends, and means for supporting the forward ends of said frame bars.

22. An agricultural machine comprising, in combination, a tractor, an implement frame including fore and aft extending frame bars connected with the tractor, a corn picker unit pivotally supported adjacent the forward ends of said frame bars and including a rearwardly extending conveyor arranged to receive ears from the picking mechanism of the unit, a second corn picker unit pivotally supported by at least one of said frame bars and including conveyor means adapted to receive ears of corn from the picking mechanism and to convey them rearwardly, a husker unit supported by at least one of said frame bars and adapted to receive the ears of corn from both of said conveyors, and means for driving the latter and both of said corn picker units from the power of the tractor.

23. An agricultural machine comprising, in combination, a tractor having a draw bar, an implement frame comprising frame bars supported at least in part by the tractor and connected with said draw bar, an implement carried by said implement frame, and means acting against said draw bar for raising and lowering the implement frame relative to the tractor.

24. An agricultural implement comprising, in combination, a tractor having a draw bar, and a power lift mechanism embodying a movable member actuated by the power of the tractor, an implement frame movably connected with the tractor and supported at least in part on said draw bar, an implement carried by said frame, and means actuated by the power lift of the tractor and acting against said draw bar for raising and lowering the implement frame relative to the tractor.

25. An agricultural implement comprising, in combination, a tractor having a draw bar, and a power lift mechanism embodying a movable member actuated by the power of the tractor and movable under the control of the operator to take and retain any one of a number of adjusted positions, an implement frame movably connected with the tractor and supported at least in part on said draw bar, an implement carried by said frame, and means for adjusting the position of the implement frame, said means including said adjustable power lift mechanism and acting against said draw bar for raising and lowering said frame.

26. An agricultural machine comprising, in combination, a tractor having rear traction wheels, an implement frame, means disposed closely adjacent said rear traction wheels for supporting a portion of said implement frame, means for supporting the other portion of said frame from the front of said tractor, and an implement mounted on said frame on opposite sides of the tractor.

27. An agricultural machine comprising, in combination, a tractor having a pair of spaced apart rear traction wheels, a generally U-shaped implement frame, means disposed adjacent said rear wheels for supporting the arms of said U-shaped frame, and means connecting the intermediate portion of said U-shaped frame with the front of the tractor.

28. An agricultural machine comprising, in combination, a tractor having rear traction wheels, a generally U-shaped implement frame having arms disposed on opposite sides of the tractor, supporting means for the arms disposed adjacent said rear traction wheels, means connecting the intermediate portion of said frame with the front of the tractor, and an implement mounted on said frame on opposite sides of the tractor.

29. An agricultural machine comprising in combination, a tractor having rear traction wheels, an implement frame including fore and aft extending frame bars, supporting means for the frame including supporting wheels disposed adjacent the traction wheels of the tractor, said frame being journaled on said supporting wheels, means connecting the front portion of said implement frame with the front of the tractor, and a plurality of implements carried by said frame.

30. In an agricultural machine, the combination of a tractor having traction wheels, an implement frame comprising interconnected fore and aft extending frame bars disposed on opposite sides of the tractor, auxiliary supporting wheels for said frame bars, said wheels being disposed adjacent the rear portions of said bars and in close proximity to the rear wheels of the tractor, said supporting wheels being arranged to support the principal part of the weight of said frame and implement, and means connecting the forward ends of said frame bars to the forward portion of the tractor so that a portion of the weight of the implement frame and the implement thereon is supported upon the front of the tractor.

31. An agricultural machine comprising, in combination, a tractor having rear traction wheels, an implement frame including fore and aft extending frame bars connected together adjacent their forward ends, auxiliary supporting wheels for the implement frame, said wheels being disposed adjacent the rear traction wheels of the tractor, means connecting the forward portions of said frame bars with the front portion of the tractor to impose a portion of the implement frame on the front of the tractor, an operating unit disposed on the implement on each side of the tractor adjacent the front portion thereof, and an operating unit also carried by said frame and disposed rearwardly of said auxiliary supporting wheels.

32. An agricultural machine comprising, in combination, a tractor having rear traction wheels, an implement frame including fore and aft extending frame bars arranged on opposite sides of the tractor, means supporting the forward portions of said frame bars on the front of the tractor, auxiliary supporting wheels associated with the oppositely mounted frame bars, said wheels being disposed adjacent the rear traction wheels of the tractor, an operating unit mounted on said frame on each side of the tractor and disposed adjacent the front portion thereof, a third operating unit disposed rearwardly of said auxiliary wheels, and a reenforcing structure for said frame including a transversely arranged member extending over the tractor and connected with said frame bars adjacent the auxiliary wheels.

33. An agricultural machine comprising, in combination, a tractor having front and rear supporting wheels, an implement frame including laterally disposed frame bars interconnected adjacent their forward ends and supported on the forward portion of the tractor, ground engaging supporting means for the rear portions of said frame bars, said means being positioned adjacent the rear wheels of the tractor, two corn picker units, one disposed on each side of the tractor and supported adjacent the front of the tractor, and a corn husker unit mounted on said frame and disposed rearwardly of said ground engaging supporting means.

34. An agricultural implement comprising, in combination, a tractor having front and rear supporting wheels, a generally U-shaped implement frame embracing the front portion of the tractor, means connecting the intermediate portion of said U-shaped frame with the front of the tractor, auxiliary supporting wheels for the rear portions of said frame, an upwardly arched transversely disposed member interconnecting the rear portions of said U-shaped frame, and operating units carried by said U-shaped frame both fore and aft of said transversely disposed frame bar.

35. An agricultural machine comprising, in combination, a tractor having front and rear supporting wheels, a generally U-shaped implement frame including frame bars disposed on opposite sides of the tractor and having their forward ends interconnected, means supporting said interconnected ends of the bars on the tractor adjacent the front wheels thereof, a corn picker unit supported by said frame on each side of the tractor, auxiliary supporting wheels connected with said frame bars intermediate the ends thereof, and a husker unit for each of said picker units, said husker units being mounted on said frame bars rearwardly of said auxiliary supporting wheels.

36. An agricultural machine comprising, in combination, a tractor having front and rear supporting wheels, a generally U-shaped implement frame including longitudinally disposed frame bars arranged on opposite sides of the tractor with their forward ends connected together and supported upon the tractor adjacent the front wheels thereof, said frame bars extending rearwardly alongside the tractor adjacent the rear wheels thereof, auxiliary supporting wheels disposed adjacent the rear wheels of the tractor and supporting the rear portions of said frame bars, a picker unit carried by said frame on each side of the tractor and forwardly of said auxiliary supporting wheels, and a husker unit disposed on each side of the tractor and carried by said implement frame rearwardly of said auxiliary supporting wheels.

37. An agricultural implement comprising, in combination, a tractor having front and rear supporting wheels, an implement frame comprising a generally U-shaped structure embodying longitudinally arranged frame bars disposed on opposite sides of the tractor and having their forward ends interconnected and supported upon the front of the tractor, the rear ends of said frame bars extending alongside the tractor adjacent the rear wheels thereof, auxiliary supporting wheels for the rear ends of said frame bars, a transversely disposed frame bar connecting the rear ends of said first mentioned frame bars and passing over the tractor, corn picker units carried by said U-shaped frame, one picker unit being disposed on each side of the tractor and forwardly of said auxiliary supporting wheels, husker units also carried by said U-shaped frame and arranged on opposite sides of the tractor rearwardly of said auxiliary supporting wheels, and means reacting against said transverse frame bar for adjusting the height of said picker units.

38. An agricultural machine comprising, in combination, a tractor having traction wheels, an implement frame comprising two separated frame sections disposed on opposite sides of the tractor, implement wheels supporting said implement frame, one wheel for each of said sections, said implement wheels being disposed adjacent the traction wheels, means rigidly connecting said separated frame sections together, means directly connecting the implement wheels with the traction wheels to rotate therewith, and means connecting said frame with the tractor.

39. An agricultural machine comprising, in combination, a tractor having traction wheels, an implement frame comprising frame bars and supporting wheels, said frame including interconnected portions disposed on opposite sides of the tractor so as to position the implement wheels adjacent said traction wheels, an upwardly arched reenforcing member extending over the tractor and connecting said oppositely disposed frame portions, implement means carried by said frame, and means connecting said frame with the tractor.

40. An agricultural machine comprising a tractor having rear traction wheels and driving connections therefor arranged with reverse mechanism for driving the tractor rearwardly, an implement frame pivotally connected with the tractor and extending rearwardly thereof beyond said traction wheels, an agricultural implement mounted on said frame with its forward portion extending rearwardly of the tractor, whereby when the tractor is driven in reverse the implement is propelled forwardly along the line of advance, and means operative by the power of the tractor for raising and lowering said implement.

41. In a tractor pushed implement, the combination of a tractor having traction wheels, fore and aft extending frame bars constituting an implement frame, journal means secured to said bars intermediate their ends, supporting wheels carried by said journal means and arranged to support the principal part of the weight of said frame and implement and disposed adjacent the position of said traction wheels on opposite sides of the tractor, an operating unit carried by said implement frame adjacent the forward ends of said frame bars, and a second operating unit carried by said frame bars adjacent their rear ends.

42. An agricultural machine comprising, in combination, a tractor, an implement frame including fore and aft extending frame bars disposed on opposite sides of the tractor, implement supporting wheels operatively connected with said frame bars intermediate their ends on opposite sides of the tractor and serving to support at least a substantial portion of the weight of said implement frame, corn picker means supported adjacent the forward ends of said frame bars and including rearwardly extending conveyor means arranged to receive ears of corn from the picking means, husking means supported at the rear ends of said frame bars rearwardly of the axis of said implement supporting wheels and adapted to receive corn from said conveyor means, and means for driving the picker means, the conveyor means, and said husking means from the power of the tractor.

43. An agricultural machine comprising, in combination, a tractor having rear traction wheels, an implement frame comprising rigidly interconnected frame sections disposed on opposite sides of the tractor, means disposed closely adjacent the rear traction wheels of the tractor for supporting at least a substantial portion of the weight of said implement frame, and implement operating mechanism supported by said frame and disposed thereon both fore and aft of said supporting means and on opposite sides of the tractor.

44. An agricultural implement comprising, in combination, a tractor having a pair of spaced apart rear traction wheels, a generally U-shaped implement frame embracing the tractor and having portions disposed on opposite sides thereof, means disposed adjacent the rear traction wheels of the tractor for supporting said U-shaped frame, and implement means carried by said frame and disposed both fore and aft of said supporting means.

45. An agricultural implement comprising, in combination, a tractor having front and rear supporting wheels, a generally U-shaped implement frame embracing the front portion of the tractor, auxiliary supporting wheels for said frame, an upwardly arched transversely disposed member interconnecting the lateral portions of said U-shaped frame, and operating units carried by said U-shaped frame both fore and aft of said auxiliary supporting wheels.

46. An agricultural machine comprising, in combination, a tractor having front and rear supporting wheels, a generally U-shaped implement frame including longitudinally disposed frame bars arranged on opposte sides of the tractor with their forward ends connected together, said frame bars extending rearwardly alongside the tractor adjacent the rear wheels thereof, auxiliary supporting wheels disposed adjacent the rear wheels of the tractor, a picker unit carried by said frame on each side of the tractor and forwardly of said auxiliary supporting wheels, and a husker unit disposed on each side of the tractor and carried by said implement frame rearwardly of said auxiliary supporting wheels.

47. An agricultural implement comprising, in combination, a tractor having front and rear supporting wheels, an implement frame comprising a generally U-shaped structure embodying longitudinally arranged frame bars disposed on opposite sides of the tractor, the rear ends of said frame bars extending alongside the tractor adjacent the rear wheels thereof, auxiliary supporting wheels for the rear ends of said frame bars, a transversely disposed frame bar connecting the rear ends of said first mentioned frame bars and passing over the tractor, corn picker units carried by said U-shaped frame, one picker unit being disposed on each side of the tractor and forwardly of said auxiliary supporting wheels, husker units also carried by said U-shaped frame and arranged on opposite sides of the tractor rearwardly of said auxiliary supporting wheels, and means for adjusting the height of said picker units.

48. An attachment for tractors and the like having supporting wheels comprising an implement frame having laterally spaced portions adapted to embrace the tractor on opposite sides thereof adjacent said wheels, frame bars rigidly interconnecting said portions, and implement wheel means for supporting at least a portion of said frame and adapted to be attached to the supporting wheels of the tractor.

49. An agricultural machine comprising, in combination, a tractor having supporting wheels, an implement frame unit comprising rigidly interconnected sections disposed on opposite sides of the tractor, and supporting wheels therefor of the same diameter as said tractor wheels and adapted to be directly connected therewith.

50. An agricultural machine comprising, in combination, a tractor having a traction wheel, an implement including a frame, means supporting one portion of the frame on the front of the tractor, and means directly connected with said traction wheel for supporting the other portion of said frame directly thereon.

51. An agricultural machine comprising, in combination, a tractor having at least one traction wheel, an implement including a frame, means supporting one portion of the frame on the front of the tractor, means directly connected with said one traction wheel for supporting another portion of said frame directly thereon, and means connecting another portion of the implement frame with the tractor rearwardly of said first mentioned supporting means.

52. An agricultural machine comprising, in combination, a tractor having a rear wheel, an implement frame, means connected directly with the rim of said rear wheel for supporting a portion of said implement frame, means for supporting the other portion of said frame from the front of the tractor, and an implement mounted on said frame.

53. An agricultural machine comprising, in combination, a tractor having rear traction wheels, an implement frame including a fore and aft extending frame bar, supporting means for the frame including a supporting wheel connected with one of the traction wheels of the tractor, means connecting the front portion of said implement frame with the front of the tractor, and an implement carried by said frame.

54. In a tractor propelled implement, the combination of a tractor having traction wheels, means including a fore and aft extending frame bar constituting an implement frame, journal means secured to said bar intermediate its ends, an implement supporting wheel carried by said journal means and arranged to support the principal part of the weight of said frame and implement and disposed adjacent the position of one of said traction wheels at one side of the tractor, and an operating unit carried by said implement frame.

55. A tractor propelled implement, the combination of a tractor having traction wheels, means including a fore and aft extending frame bar constituting an implement frame, journal means secured to said bar intermediate its ends, an implement supporting wheel carried by said journal means and arranged to support the principal part of the weight of said frame and implement and disposed adjacent the position of one of said traction wheels at one side of the tractor, an operating unit carried by said implement frame, and means connecting the front portion of said frame bar with the front of the tractor.

56. An agricultural machine comprising, in combination, a tractor, an implement frame including a fore and aft extending frame bar disposed adjacent one side of the tractor, implement supporting wheel means operatively connected with said frame bar intermediate its ends serving to support at least a substantial portion of the weight of said implement frame, corn picker means supported adjacent the forward end of said frame bar and including rearwardly extending conveyor means arranged to receive ears of corn from the picking means, husking means supported at the rear end of said frame bar rearwardly of the axis of said implement supporting wheel means and adapted to receive corn from said conveyor means, and means for driving the picker means, the conveyor means, and said husking means from the power of the tractor.

57. The combination with a tractor comprising rear traction wheels and a relatively narrow front steering truck having dirigible wheels, of an agricultural implement frame of substantially horizontal U-shape formation embracing said tractor with the open end of the frame disposed adjacent the rear of the tractor, supporting wheels for said frame, connecting means for causing said implement wheels to move simultaneously with certain of the wheels of the tractor, and means detachably connecting said frame with said tractor.

58. In a tractor pushed implement, the combination of a tractor having traction wheels, a generally U-shaped frame embracing the tractor and including generally longitudinally disposed frame bars extending rearwardly to points adjacent the traction wheels of the tractor, operating units carried by said frame bars, one on each side of the tractor, and means supporting the forward portion of said frame.

59. In a tractor pushed implement, the combination of a tractor having traction wheels, a generally U-shaped frame embracing the tractor and including generally fore and aft extending frame bars, operating units carried by said frame bars, one on each side of the tractor, means including implement wheels supporting at least a substantial portion of the weight of the frame and said units, and means connecting the forward portion of said frame bars with the forward portion of the tractor so that a portion of the weight of the implement frame and the units supported thereby is carried upon the front end of the tractor.

60. An agricultural machine comprising, in combination, a tractor having rear traction wheels, implement frame means comprising a generally U-shaped frame embracing the tractor and having means serving as rearwardly extending frame bars disposed alongside the tractor, means associated with said frame bars for supporting the major portion of the weight of said implement frame, means for supporting the other portion of said frame, and an implement mounted on said frame bars on opposite sides of the tractor.

61. An agricultural machine comprising, in combination, a tractor having rear traction wheels, a generally U-shaped implement frame having arms disposed on opposite sides of the tractor, supporting means for the U-shaped frame connected directly with said arms for carrying at least a substantial portion of the weight of said frame and including wheel means disposed substantially in the plane of said rear traction wheels, means supporting the front portion of the frame on the front part of the tractor, and operating units mounted on said frame on opposite sides of the tractor.

62. In a tractor propelled implement, the combination of a tractor having a longitudinally extending body, means including a fore and aft extending frame bar disposed along one side of the tractor body and constituting an implement frame, journal means connected to said frame bar intermediate its ends, an implement supporting wheel carried by said journal means and arranged to support a substantial part of the weight of said frame and implement and disposed at one side of the tractor, and an operating unit carried by said implement frame.

63. In a tractor propelled implement, the combination of a tractor having a longitudinally extending body, means including a fore and aft extending frame bar disposed along one side of the tractor body and constituting an implement frame, journal means connected to said frame bar intermediate its ends, an implement supporting wheel carried by said journal means and arranged to support a substantial part of the weight of said frame and implement and disposed at one side of the tractor, an operating unit carried by said implement frame, and means connecting the front portion of said frame bar with the front of the tractor.

64. The combination with a tractor comprising rear traction wheels and front steering wheels, of an agricultural implement comprising a U-shaped frame embracing the front end of the tractor, harvesting units mounted upon said frame on each side of the tractor with the front ends thereof positioned substantially in the transverse plane of said front steering wheels, and auxiliary supporting wheels for the implement for supporting a substantial part of the weight of the implement.

65. The combination with a tractor comprising front steering wheels and a relatively narrow body supported on a front steering truck, of an agricultural implement comprising a U-shaped frame embracing the front end of the tractor, harvesting units mounted upon said frame on each side of the tractor with the front ends thereof positioned substantially in the transverse plane of said front steering truck, and auxiliary supporting wheels for the implement disposed rearwardly of said front steering truck and connected with said implement frame for supporting a substantial part of the weight of the implement.

66. An agricultural machine comprising, in combination, a tractor having traction wheels, an implement frame comprising frame bars and supporting wheels of the same diameter as the traction wheels of the tractor and arranged to be directly connected therewith, means serving as a support fixedly connected to the tractor, means connecting the implement frame with said support, an implement carried by said implement frame, and means for raising and lowering the implement frame relative to the tractor.

67. An agricultural machine comprising, in combination, a tractor having a supporting member, an implement frame comprising frame bars supported at least in part by the tractor and connected with said supporting member, an implement carried by said implement frame, and means acting against said supporting member for raising and lowering the implement frame relative to the tractor.

68. An agricultural implement comprising, in combination, a tractor having a support, and a power lift mechanism embodying a movable member actuated by the power of the tractor, an implement frame movably connected with the tractor and carried at least in part on said support, an implement carried by said frame, and means actuated by the power lift of the tractor and acting against said support for raising and lowering the implement frame relative to the tractor.

69. An agricultural implement comprising, in combination, a tractor having a support, and a power lift mechanism embodying a movable member actuated by the power of the tractor and movable under the control of the operator to take and retain any one of a number of adjusted positions, an implement frame movably connected with the tractor and carried at least in part on said support, an implement carried by said frame, and means for adjusting the position of the implement frame, said means including said adjustable power lift mechanism and acting against said support for raising and lowering said frame.

OSCAR F. CARLSON.